(12) United States Patent
Blomaard et al.

(10) Patent No.: US 11,390,034 B2
(45) Date of Patent: Jul. 19, 2022

(54) METHOD AND PRINTING SYSTEM FOR PRINTING A THREE-DIMENSIONAL STRUCTURE, IN PARTICULAR AN OPTICAL COMPONENT

(71) Applicant: LUXEXCEL HOLDING B.V., Eindhoven (NL)

(72) Inventors: Ricardo Blomaard, Middelburg (NL); Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 689 days.

(21) Appl. No.: 16/334,064

(22) PCT Filed: Aug. 23, 2017

(86) PCT No.: PCT/EP2017/071257
§ 371 (c)(1),
(2) Date: Mar. 18, 2019

(87) PCT Pub. No.: WO2018/054641
PCT Pub. Date: Mar. 29, 2018

(65) Prior Publication Data
US 2019/0255779 A1    Aug. 22, 2019

(30) Foreign Application Priority Data
Sep. 20, 2016    (EP) .................................... 16189569

(51) Int. Cl.
*B29C 64/393*    (2017.01)
*B33Y 50/02*    (2015.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/112; B29C 64/209; B29C 64/393; B29D 11/00432; B29D 11/00951;
(Continued)

(56) References Cited

U.S. PATENT DOCUMENTS

2006/0111807 A1* 5/2006 Gothait ................. B29C 64/112
700/119
2012/0249640 A1* 10/2012 Ohnishi ................. B41J 2/2128
347/13
(Continued)

FOREIGN PATENT DOCUMENTS

| EP | 2295227 A2 | 3/2011 |
|---|---|---|
| WO | 03/004280 A2 | 1/2003 |

OTHER PUBLICATIONS

International Search Report, and Written Opinion for International Application No. PCT/EP2017/071257, dated Jan. 2, 2018.
(Continued)

*Primary Examiner* — Yuhui R Pan
(74) *Attorney, Agent, or Firm* — The Dobrusin Law Firm, P.C.

(57) ABSTRACT

A method and printing system for printing a three-dimensional structure, in particular an optical component, by depositing droplets of printing ink side by side and one above the other in several consecutive depositing steps by means of a print head. In each depositing step a plurality of droplets is ejected simultaneously by a plurality of ejection nozzles of the print head. After at least one depositing step, surface properties of a pre-structure built up by the deposited droplets are measured by a measuring unit in a measuring step. Ejection characteristics of the ejection nozzles are determined in dependency of the measured surface proper-
(Continued)

ties in a determining step and at least one following depositing step is performed in dependency of the determined ejection characteristics.

18 Claims, 1 Drawing Sheet

(51) Int. Cl.
| | |
|---|---|
| *B33Y 10/00* | (2015.01) |
| *B33Y 30/00* | (2015.01) |
| *B29C 64/112* | (2017.01) |
| *B29C 64/209* | (2017.01) |
| *B29D 11/00* | (2006.01) |
| *B33Y 80/00* | (2015.01) |
| *B29L 11/00* | (2006.01) |

(52) U.S. Cl.
CPC .. *B29D 11/00432* (2013.01); *B29D 11/00951* (2013.01); *B33Y 10/00* (2014.12); *B33Y 30/00* (2014.12); *B33Y 50/02* (2014.12); *B29L 2011/0016* (2013.01); *B33Y 80/00* (2014.12)

(58) Field of Classification Search
CPC . B29L 2011/0016; B33Y 10/00; B33Y 30/00; B33Y 50/02; B33Y 80/00
See application file for complete search history.

(56) References Cited

U.S. PATENT DOCUMENTS

2015/0352781 A1* 12/2015 Hosier ................ B29C 67/0059
425/150
2016/0167298 A1* 6/2016 Mantell ................ B29C 64/112
264/40.1
2016/0332383 A1* 11/2016 Sanchez ................ B29C 64/393

OTHER PUBLICATIONS

Extended European Search Report for EP 16189669.3, dated Mar. 29, 2017.

* cited by examiner

METHOD AND PRINTING SYSTEM FOR PRINTING A THREE-DIMENSIONAL STRUCTURE, IN PARTICULAR AN OPTICAL COMPONENT

BACKGROUND

The present invention relates to a method for printing a three-dimensional structure, in particular an optical component, by depositing droplets of printing ink side by side and one above the other in several consecutive depositing steps by means of a print head, wherein in each depositing step a plurality of droplets is ejected simultaneously by a plurality of ejection nozzles of the print head and wherein after at least one depositing step properties of a pre-structure built up by the deposited droplets are measured by a measuring unit in a measuring step.

It is common knowledge that products provided with optical structures can be manufactured in a comparably time-saving and inexpensive way by printing the optical structures directly on an appropriate substrate by using droplet-on-demand (DOD) inkjet printing technologies. Such like imprinted optical structures comprise lenses, mirrors or retroreflectors, for instance. The substrate can be made of synthetic material or glass. Furthermore, it is well known to cure the imprinted material by using light irradiation for reducing the overall printing time. For example, prior art documents EP 2 631 686 A1 EP 2 636 531 A1, EP 2 846 982 A1, EP 2 846 983 A1 and EP 2 846 984 A1 explain in detail how such like printing processes can be implemented.

In order to provide high quality optical structures with certain optical functions, the geometries and the surface contours of the three-dimensional optical structures have to be precisely designed and built up according to a given pattern. Even the slightest deviation in the intended geometry of the optical structures results in significant optical errors. Consequently, the droplets have to be positioned onto the substrate with high accuracy and curing has to be performed depending on the present flow behavior of the printing ink.

For this purpose, prior art document EP 2 474 404 A1 discloses a print head for printing optical structures on a substrate by use of an ejection device for ejecting droplets of printing ink towards the substrate additionally comprising a measuring unit for contactless measuring physical parameters of the at least one deposited droplet, wherein the physical parameter can be a geometrical parameter, like thickness and/or surface contour of a layer of deposited droplets. The aim of this approach is to identify potential deviations from the desired geometry and to compensate any measured inaccuracies in the shape of the optical structure by adjusting the ejection direction and ejecting further droplets onto the still incorrect optical structure.

However, practice has shown that the above mentioned deviations and inaccuracies in the printed three-dimensional structure frequently originate from deviations in the ejection rate between different ejection nozzles in one print head as they do not precisely eject the same amount of printing ink with each droplet. In particular, there is always at least one inaccurate working nozzle ejecting significantly less amount of printing ink with each droplet due to clogging of the nozzle by cured printing ink or by contamination with e.g. foreign particles and impurities. The resulting deviations sum up with every new layer of printing ink (usually there are thousands of layers stacked above each other) to inequalities and non-uniformities in the printed three-dimensional structures. Usually, these inequalities and non-uniformities are so small that no visible and disturbing influences occur. However, when printing three-dimensional structure serving as optical components, like lenses and in particular ophthalmic lenses, even the finest small inequalities and non-uniformities lead to serious optical defects disturbing the optical beam path. In particular, these inequalities and non-uniformities generate unwanted diffractive phenomena. The problem is that the locations of inaccurate working nozzles in the print head are usually not known and additionally change over time due to clogging.

The drawback of the method known from prior art document EP 2 474 404 A1 is that it only addresses deviations and inaccuracies in the already printed structure. If an ejection nozzle of the printing head works insufficient, the quantity and quality of deviations and inaccuracies in the printed three-dimensional structure grow with every new layer of droplets and cannot be compensated at some point, in particular if compensation measures are performed with an insufficient working ejection nozzle by accident.

SUMMARY

It is therefore an object of the present invention to provide a method and a printing system for printing three-dimensional structures, in particular optical components, without inequalities and non-uniformities arising from deviations in the ejecting characteristics between different ejection nozzles, so that diffractive effects in the printed three-dimensional structure can securely be avoided. In particular, a method and a printing system should be provided avoiding inequalities and non-uniformities in the printed three-dimensional structure already before the whole three-dimensional structure it has been printed.

The object of the present invention is achieved with a method for printing a three-dimensional structure, in particular an optical component, by depositing droplets of printing ink side by side and one above the other in several consecutive depositing steps by means of a print head, wherein in each depositing step a plurality of droplets is ejected simultaneously by a plurality of ejection nozzles of the print head, wherein after at least one depositing step properties of a pre-structure built up by the deposited droplets are measured by a measuring unit in a measuring step and wherein ejection characteristics of the ejection nozzles are determined in dependency of the measured properties in a determining step and at least one following depositing step is performed in dependency of the determined ejection characteristics.

It is herewith advantageously possible to identify not only any inaccuracies or deviations of the pre-structure which has already been printed but to identify the origin of these inaccuracies or deviations namely the ejection nozzle not working properly and therefore causing these inaccuracies or deviations. The main advantage is that if the not properly working nozzles (referred to as malfunctioning nozzles in the following) are once identified in a certain printing process, the location of these malfunctioning nozzles can be considered in following depositing steps, so that further inaccuracies or deviations in the printed pre-structure or even in the printed three-dimensional structure can be avoided. In this way also the problem that locations of nozzles which do not work properly due to clogging are usually not known and change over time can be solved because the current presence, absence and/or location of clogged nozzles can be determined on the basis of the measured properties during operation of the current printing process. Consequently, the method according to the present invention substantially increases printing accuracy and provides printing of three-dimensional structures which can serve as optical components, like lenses and in particular ophthalmic lenses, due to their improved quality. An activated ejection nozzle which does not eject a droplet with a predefined amount of printing ink dictated by a printing controller during a depositing step due to e.g. clogging is referred to in the following as malfunctioning ejection nozzle. An activated ejection nozzle which ejects a droplet with a predefined amount of printing ink equal to what has precisely been dictated by a printing controller during a depositing step is referred to in the following as properly functioning ejection nozzle. The pre-structure whose surface is measured in the measuring step has been built up by one or more previously performed depositing steps. In the sense of the present invention, one or more following depositing steps are performed in dependency of the determined ejection characteristics. It is also conceivable that the measuring and/or determining steps are performed after each or after a predefined number of depositing step and that the following depositing step is always performed in dependency of the ejection characteristics newly determined each time a measuring step is performed. The properties are preferably geometrical properties, in particular surface properties, like flow of the upper surface of the pre-structure or height of the pre-structure. Alternatively, the properties comprise optical properties, like refractive or diffractive effects of the pre-structure.

The printing ink comprises preferably transparent or trans-lucent printing ink. Preferably, the printing ink comprises an UV curable liquid monomer becoming a polymer if being cured. Preferably, the droplets are deposited onto a substrate. The substrate can be a part of the printed structure or a support plate for supporting the deposited droplets only during the printing process.

The print head is preferably movable relative to the deposited droplets in a moving step. It is conceivable that the print head is moved relative to the deposited droplets in a moving step performed between two subsequent depositing steps. Movement of the print head relative to the deposited droplets is preferably obtained by actively driving the print head, while the substrate on which the droplets are deposited preferably stands still, or by moving the substrate on which the droplets are deposited, while the print head preferably stands still. It is also conceivable that both the print head as well as the substrate are moved actively. However, the wording "moving the print head relative to the deposited droplets" does not necessarily means in the sense of the present invention that the print head is actually moved because alternatively the substrate on which the droplets are deposited can e.g. solely be moved to obtain the relative movement between the print head and the deposited droplets. This can be done also in any of the following preferred embodiments. The printing data are provided to the printer be means of an intensity image. The intensity image preferably comprises a two-dimensional pattern of different grey or colour intensities. The pattern consists of different pixels, wherein each pixel represents a certain position in the three-dimensional structure to be printed. In particular, each pixel represents a certain position of a two-dimensional projection of the three-dimensional structure onto a flat base plane. The distribution of the intensity in the intensity image represents the shape of the three-dimensional structure to be printed as the intensity in each pixel is a value for the height of the three-dimensional structure at the corresponding position. The height of the printed three-dimensional structure in a certain position depends on the number/size of droplets of printing ink and accordingly to the amount of printing material deposited in this position. The print head deposits printing ink in dependency of the intensity image, so that a three-dimensional structure is printed having the shape of the software based-virtual design given by the intensity image.

As known from the prior art, the deposited droplets are at least partly cured after each step of depositing droplets in a curing step. The printing ink of the deposited droplets are either fully cured after each depositing step or only partly cured. In the second case, a final curing step is performed after finishing the three-dimensional structure.

It is conceivable that the pre-structure comprises only a flat pattern, in particular over the whole possible printing area, whose sole purpose is to determine the ejection rates of all ejection nozzles at the beginning of each printing process. The actual printing process for building up the desired three-dimensional structure only starts after the ejection rates of all ejection nozzles have been determined. In this case, the measuring and determining step are performed only once at the beginning of the printing process and all following depositing steps are performed in dependency of ejection rates determined in this initial single measuring and determining step.

According to a preferred embodiment of the present invention, at least an ejection rate of a respective ejection nozzle is determined by a processing unit when determining ejection characteristics of ejection nozzles in the determining step, wherein the ejection rate is preferably determined by comparing the measured surfaces properties with a pre-defined nominal surface pattern. It is herewith advantageously possible to determine whether a certain ejection nozzle is clogged or not simply by analyzing the corresponding location or pixel in the area where this ejection nozzle deposited a droplet within the last depositing step. In particular, the ejection rate is determined in dependency of a surface flow of the pre-structure whose surface properties are measured. The surface flow is derived from the measured surface properties of the pre-structure. It is e.g. conceivable that the measuring unit measures the height in each location/pixel or the overall flatness of the surface of the pre-structure. The malfunctioning ejection nozzles can be localized by analyzing the surface flow. If a local depression is found in the surface flow (which is not caused by the design of the three-dimensional structure to be printed) at a certain location or pixel, the corresponding ejection nozzle located above that depression (at least during the last depositing step) must be a malfunctioning ejection nozzle whose ejection rate is too low as it remains below a predefined lower ejection rate threshold. If a local protrusion is found in the surface flow (which is not caused by the design of the three-dimensional structure to be printed) at a certain location or pixel, the corresponding ejection nozzle located above that protrusion (at least during the last depositing step) must be a malfunctioning ejection nozzle whose ejection rate is too high as it exceeds a predefined upper ejection rate threshold. If a local depression or protrusion is not found in a certain location or pixel, the corresponding ejection nozzle located above that location or pixel (at least during the last depositing step) must be a properly functioning ejection nozzle as its ejection rate remains within a predefined ejection rate target interval.

It is conceivable that the maximum variation is quantified by the above mentioned predefined upper and lower ejection rate thresholds. Those ejection nozzles whose ejection rate remains below the predefined lower ejection rate threshold or whose ejection rate exceeds the predefined upper ejection rate threshold are identified as malfunctioning ejection nozzles in the determining step and those ejection nozzles whose ejection rate remains within the predefined ejection rate target interval are identified as properly functioning ejection nozzles. In the determining step, the surface flow is identified to localize malfunctioning ejection nozzles whose ejection rate lies outside the predefined ejection rate target interval. Alternatively or additionally, a smooth surface flow is identified in the determining step in order to localize properly functioning ejection nozzles whose ejection rate remains inside the predefined ejection rate target interval. Preferably, for each of all ejection nozzles which have been activated or used in the foregoing depositing step an assessment is carried out in the determining step whether it is a malfunctioning ejection nozzle or a properly functioning ejection nozzle. The width of the predefined ejection rate target interval is controllable so that the accuracy of the three-dimensional structure to be printed can be adapted freely and continuously.

According to another preferred embodiment of the present invention, the ejection nozzles are controlled by means of a printing controller in dependency of the determined ejection rate in the at least one following depositing step, whereas malfunctioning ejection nozzles whose ejection rates remains below a predefined lower ejection rate threshold are controlled in such a manner that the amount of printing ink ejected with each droplet is increased, preferably doubled, tripled or quadruplicated, in the at least one following depositing step and/or whereas malfunctioning ejection nozzles whose ejection rates exceeds a predefined upper ejection rate threshold are controlled in such a manner that the amount of printing ink ejected with each droplet is decreased, preferably halved, divided by three or four, and/or whereas properly functioning ejection nozzles are controlled in such a manner that the amount of printing ink ejected with each droplet is decreased, preferably halved, in the at least one following printing step. Advantageously, the malfunctioning ejection nozzles do not need to be deactivated. In contrast, the amount of printing ink ejected with each droplet in following depositing step is selectively raised or lowered only at the malfunctioning nozzles so that the deviations to the properly functioning nozzles is reduced causing less inequalities and non-uniformities in the three-dimensional structure to be printed. Alternatively or additionally, only the properly functioning ejection nozzles are controlled in such a manner that the amount of printing ink ejected with each droplet in following depositing steps can be reduced compared to the foregoing depositing step in order to align the ejecting characteristics of the properly functioning ejection nozzles with the ejection characteristics of malfunctioning ejection nozzles having an ejection rate remaining below the predefined lower ejection rate threshold.

Alternatively or additionally, not only the amount of printing ink of one single droplet ejected by the ejection nozzles in one single depositing step is adapted but the number of droplets ejected by the ejection nozzles in one single depositing step. Preferably, the ejection nozzles are controlled by means of a printing controller in dependency of the determined ejection rate in the at least one following depositing step, whereas malfunctioning ejection nozzles whose ejection rates remains below a predefined lower ejection rate threshold are controlled in such a manner that the number of droplets ejected by malfunctioning ejection nozzles in the at least one following depositing step is increased, preferably doubled, tripled or quadruplicated, while the properly functioning ejection nozzles ejects preferably only one droplet in the at least one following printing step. It is e.g. conceivable that malfunctioning ejection nozzles eject respectively two or more droplets in each following depositing step, whereas the properly functioning ejection nozzles continue to eject only one single droplet per following depositing step in order to align the ejecting characteristics of the properly functioning ejection nozzles with the ejection characteristics of the malfunctioning ejection nozzles. It is also conceivable that malfunctioning nozzles whose ejection rates exceeds a predefined upper ejection rate threshold are controlled in such a manner that less droplets are ejected in the at least one following depositing step. In this case, the properly functioning ejection nozzles continue to eject more than one single droplet, preferably two, three, four or five droplets per following depositing step.

According to another preferred embodiment of the present invention, the ejection nozzles are controlled by means of a printing controller in dependency of the determined ejection rate in the at least one following depositing step, whereas malfunctioning ejection nozzles are controlled in such a manner that the amount of printing ink and the number of droplets decreased to zero in the at least one following depositing step. It is herewith advantageously possible to disable the malfunctioning ejection nozzles in one, several or all subsequent depositing steps. In this case, the print head has to be moved relative to the pre-structure between the following depositing steps in order to build up the three-dimensional structure, even if one or several malfunctioning ejection nozzles have been disabled. The print head is moved in such a manner before each following depositing step that properly functioning ejection nozzles are located at locations where disabled malfunctioning ejection nozzles where located in a previous depositing step in order to compensate disabled malfunctioning ejection nozzles by properly functioning ejection nozzles. In this way, the at least one following depositing step is performed in such a manner that only or at least as many as possible properly functioning ejection nozzles ejects droplets for building up the three-dimensional structure.

According to another preferred embodiment of the present invention, the print head is moved relative to the deposited droplets in moving steps performed between subsequent depositing steps in such a manner that each pixel or location of the three-dimensional structure receives droplets from properly functioning ejection nozzles as well as droplets from malfunctioning ejection nozzles, wherein preferably the ratio between the number of droplets from properly functioning ejection nozzles and the number of droplets from malfunctioning ejection nozzles are the same or at least similar for all pixels of the three-dimensional structure after the printing of the three-dimensional structure finished. It is herewith advantageously possible to ensure that all droplets deposited in one single position or pixel of the three-dimensional structure do not solely originates from malfunctioning ejection nozzle, but to achieve that each position or pixel in the printed three-dimensional structure receives droplets from malfunction ejection nozzles and from properly functioning ejection nozzles. If the rate of droplets from malfunction ejection nozzles and from properly functioning ejection nozzles is more or less equal in all pixels or locations, potential deviations resulting from few malfunctioning ejection nozzles are compensated and averaged out.

According to another preferred embodiment of the present invention, the print head is moved relative to the deposited droplets in moving steps performed between subsequent depositing steps in such a manner that each pixel or location of the three-dimensional structure receives droplets from malfunctioning ejection nozzles whose ejection rate remains below a predefined lower ejection rate threshold as well as droplets from malfunctioning ejection nozzles whose ejection rate exceeds a predefined upper ejection rate threshold, wherein preferably the ratio between the number of droplets from malfunctioning ejection nozzles whose ejection rate remains below a predefined lower ejection rate threshold as well as the number of droplets from malfunctioning ejection nozzles whose ejection rate exceeds a predefined upper ejection rate threshold are the same or at least similar for all pixels of the three-dimensional structure after the printing of the three-dimensional structure finished. It is herewith advantageously possible that the contradictory deviations originating from malfunctioning ejection nozzles whose ejection rate remains below a predefined lower ejection rate threshold and from malfunctioning ejection nozzles whose ejection rate exceeds a predefined upper ejection rate threshold compensate each other.

According to another preferred embodiment of the present invention, the print head is moved relative to the deposited droplets in a moving step performed before the at least one following depositing step in such a manner that only or at least as many as possible properly functioning ejection nozzles are located above an area where the three-dimensional structure is to be built up in the at least one following depositing step. This embodiment is only applicable when the print head comprises a coherent area of properly functioning ejection nozzles being at least as big as the three-dimensional structure to be printed. In this case, the print head can be moved in a position in which all malfunctioning ejection nozzles are located outside the area where the three-dimensional structure is build up. Hence, all malfunctioning ejection nozzles can also be disabled.

Alternatively, it is also conceivable that the print head is moved relative to the deposited droplets in a moving step performed before the at least one following depositing step in such a manner that the distribution of malfunctioning ejection nozzles whose ejection rate remains below a predefined lower ejection rate threshold or exceeds a predefined upper ejection rate threshold and properly functioning ejection nozzles corresponds at least partly to the shape of the three-dimensional structure to be built up in the at least one following depositing step. That means if e.g. one part of the print head comprises only properly functioning ejection nozzles and another part of the print head comprises only malfunctioning ejection nozzles whose ejection rate remains below a predefined lower ejection rate threshold or exceeds a predefined upper ejection rate threshold and the three-dimensional structure to be printed similarly comprises a first part having greater or smaller heights as a second part, the print head is moved in such a position that the part of the print head with properly functioning ejection nozzles are located above or at least near the first part of the three-dimensional structure to be printed and the part of the print head with malfunctioning ejection nozzles are located above or at least near the second part of the three-dimensional structure to be printed.

The object of the present invention is also achieved with a printing system for printing a three-dimensional structure, in particular an optical component, by performing the method according to the present invention, wherein the printing system comprises a print head for depositing droplets of printing ink side by side and one above the other in several consecutive depositing steps, wherein the print head comprises a plurality of ejection nozzles for ejecting a plurality of droplets simultaneously in each depositing step, wherein the printing system comprises a measuring unit for measuring properties of a pre-structure, built up by the deposited droplets, in a measuring step and wherein the printing system further comprises a processing unit configured for determining ejection characteristics of the ejection nozzles in dependency of the measured properties in a determining step and a printing controller configured for controlling the print head in such a manner that a following depositing step is performed in dependency of the determined ejection characteristics.

Analogously to the inventive method, the printing system according to the present invention advantageously provides a substantially increased printing accuracy and therefore provides printing of three-dimensional structures which can serve as optical components, like lenses and in particular ophthalmic lenses, due to their improved quality.

The printing system comprises in particular a print head and a printing controller for controlling operation of each ejection nozzles and for controlling movement of the print head relative to the deposited droplets and/or a substrate on which the droplets are deposited. The controller can be implemented into the print head or realized as a separate unit. Again, movement of the print head relative to the deposited droplets is preferably obtained by actively driving the print head, while the substrate on which the droplets are deposited preferably stands still, or by moving the substrate on which the droplets are deposited, while the print head preferably stands still. It is also conceivable that both the print head as well as the substrate are moved actively. However, the wording "moving the print head relative to the deposited droplets" does not necessarily means in the sense of the present invention that the print head is actually moved because alternatively the substrate on which the droplets are deposited can e.g. solely be moved to obtain the relative movement between the print head and the deposited droplets. The printing system preferably comprises at least one drive unit for actively moving the print head and/or the substrate, wherein the drive unit is controlled by the controller.

Preferably, the print head is moved relative to the substrate in such a manner that each pixel of the three-dimensional structure receives droplets from properly functioning ejection nozzles as well as droplets from malfunctioning ejection nozzles, wherein preferably the ratio between the number of droplets from properly functioning ejection nozzles and the number of droplets from malfunctioning ejection nozzles are the same or at least similar for all pixels of the three-dimensional structure after the printing of the three-dimensional structure finished. The processing unit is can be implemented into the print head or realized as a separate unit. Furthermore, the processing unit can be part of the controller or the measuring unit. The processing unit is preferably configured for determining an ejection rate of a respective ejection nozzle when determining ejection characteristics of ejection nozzles in the determining step, wherein the processing unit preferably comprises a comparator for comparing the measured properties with a predefined nominal surface pattern in order to determine the ejection rate, wherein the ejection rate is determined in dependency of a surface flow of the pre-structure, wherein the surface flow is derived from the measured surface properties of the pre-structure, wherein depressions in the surface flow are identified to localize malfunctioning ejection nozzles whose ejection rate remains below a predefined lower ejection rate threshold and wherein protrusions in the surface flow are identified to localize malfunctioning ejection nozzles whose ejection rate exceeds a predefined upper ejection rate threshold and/or wherein a smooth surface flow is identified to localize properly functioning ejection nozzles whose ejection rate remains within the predefined ejection rate target interval. Alternatively or additionally the printing controller is configured to control the ejection nozzles in dependency of the determined ejection rate in such a manner that the amount of printing ink ejected with each droplet from malfunctioning ejection nozzles whose ejection rate remains below a predefined lower ejection rate threshold or exceeds a predefined upper ejection rate threshold is increased, preferably doubled, tripled or quadruplicated, or decreased, preferably divided by two, three or four, in the at least one following depositing step and/or that the amount of printing ink ejected with each droplet from properly functioning ejection nozzles is decreased, preferably halved, in the at least one following printing step and/or that the number of droplets ejected by malfunctioning ejection nozzles whose ejection rate remains below a predefined lower ejection rate threshold or exceeds a predefined upper ejection rate threshold in the at least one following depositing step is increased, preferably doubled, tripled or quadruplicated, or decreased while the properly functioning ejection nozzles ejects preferably only one, two, three, four or five droplets in the at least one following printing step, and/or that the amount of printing ink and the number of droplets from malfunctioning ejection nozzles decreased to zero in the at least one following depositing step and/or that only or at least as many as possible properly functioning ejection nozzles ejects droplets for building up the three-dimensional structure, while the ejection of droplets by malfunctioning functioning ejection nozzles is preferably disabled.

The measuring unit are provided in the print head and preferably near the ejection nozzles. Alternatively, the measuring unit is not part of the print head. It is conceivable that the measuring unit comprises a plurality of single measuring means. Preferably each measuring means is provided near an ejection nozzle, particularly preferably each ejection nozzle is provided with a measuring means. Alternatively, there are substantially less measuring means as ejection nozzles and the measuring means are distributed evenly over the entire print head or at an outer edge of the print head. However, it is also conceivable that the measuring unit comprises only one measuring means, e.g. located in the center of the print head.

According to a preferred embodiment of the present invention, the measuring means is configured for layer thickness measurements and/or distance measurements. Preferably, the measuring means is provided for determining the distance between the measuring means and the surface of the pre-structure, in particular an area of the pre-structure located straight below the measuring means. This approach allows a comparatively simple method of determining the surface properties, like thickness and/or surface contour (flow) of the pre-structure already printed in the at least one previous depositing step. It is conceivable that the measuring means performs reference measurements in between. In the reference measurements the measuring means measures the distance between the substrate and the measuring means, so that the thickness of the layer of deposited droplets can simply be calculated from the mathematical difference between the measured distance between the substrate and the measuring means (reference measurement) and the distance between the surface of the layer of deposited droplets and the measuring means. It is also conceivable that the actually measured distance is compared with a distance measured before the last depositing step in order to determine the layer thickness only of the layer deposited in the last depositing step. Preferably, the distance is measured from at least two different locations at the print head in order to increase accuracy.

Preferably, the measuring unit is a contactless measuring unit and preferably a line scanner. Particularly preferred, the measuring unit is configured for triangulation measurements. The wording triangulation measurements in the sense of the present invention principally comprises a process of determining the location of a point by measuring angles to it from known points (at the print head) at either ends of a fixed baseline, rather than measuring the distance to the point directly. Particularly, the print head is configured for performing LASER-triangulation which is a comparatively precise and reliable method for determining geometry parameters. But also other contactless measurement methods e.g. based on ultrasonic waves or other light source can be used for distance measurements and especially for triangulation measurements in the sense of the present invention. For using LASER-triangulation measurements, the measuring unit comprises at least one LASER source for projecting a laser spot onto the at least one deposited droplet and at least one receiving means, preferably a CCD—(Charge Coupled Device) camera for receiving the laser light of the at least one LASER source after reflection at the deposited droplet. Furthermore, an evaluation unit is provided for calculating the surface properties from the position of the laser spot on the deposited droplet and from the known distance between the LASER source and the receiving means at the print head (in particular the baseline is parallel to the substrate). In this manner, the angle between the light beam sent out by the LASER and the reflected corresponding light beam received by the CCD-camera is measured. From this the distance to the surface of the deposited droplet and in particular the thickness of the layer of printing ink on the substrate can be calculated.

According to another preferred embodiment, the measuring unit is configured for optical interference measurements. The measuring unit comprises e.g. an interferometer which is capable of performing precision measurements of the thickness and/or the surface contour of the layer of deposited droplets by using Interferometry. According to this technique, two or more light waves are analyzed by their superposition, so that slight phase shifts in the light waves can be detected. It is further conceivable that a light wave reflected by the surface of the layer of deposited droplets is superposed with a reference light wave in order to determine the thickness of the layer, for instance.

According to another preferred embodiment, the printing system comprises at least one further print head for depositing compensation droplets at locations in a further depositing step, where droplets from malfunctioning ejection nozzles of the print head whose ejection rate remains below a predefined lower ejection rate threshold have been deposited. It is conceivable that in the determining step all malfunctioning ejection nozzles of the print head whose ejection rate remains below a predefined lower ejection rate threshold are identified and that the further print head is used for placing additional compensation droplets at locations where droplets of the malfunctioning ejection nozzles have been deposited in the depositing step after each depositing step in the further depositing step. It is herewith possible to avoid depressions in the surface of the structure to be printed as they are compensated by depositing the compensation droplets.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
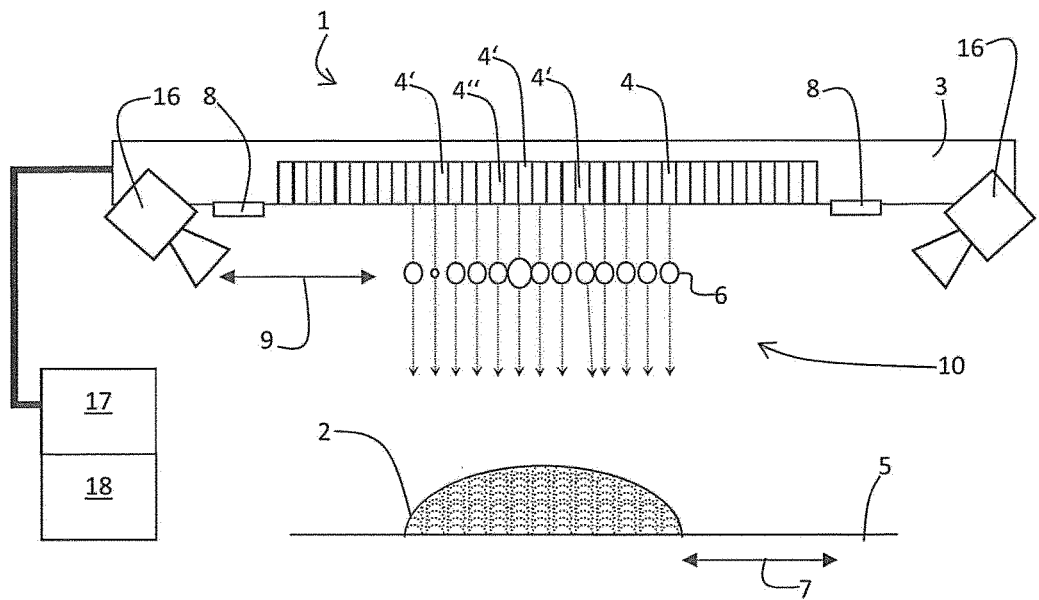
FIG. 1 illustrates schematically a printing system and a method for printing a three-dimensional structure, in particular an optical component, by depositing droplets of printing ink side by side and one above the other in several consecutive depositing steps by means of a print head according to an exemplary embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a method and a printing system 1 for printing a three-dimensional structure 2 are schematically illustrated. In the present example, the three-dimensional structure 2 comprises an optical component and in particular an ophthalmic lens.

The printing system 1 comprises a print head 3 equipped with a plurality of ejection nozzles 4. The ejection nozzles 4 are arranged in parallel on the lower side of the print head 3. Each ejection nozzle 4 is in fluid connection with a reservoir of printing ink (not shown) and comprises piezoelectric crystals to eject a droplet 6 of printing ink from the print head towards a substrate 5. The printing system 1 can therefore also referred to as DOD (droplets-on-demand) inkjet printer. In each depositing step 10, a volley of several droplets 6 are ejected in parallel and simultaneously towards the substrate 5, so that a layer of deposited droplets 6 arranged side by side onto the substrate 5 is generated. With each following depositing step 10, a further layer of deposited droplets 6 are provided onto the former layer of deposited droplets 6.

After deposition of the droplets 6, adjacent deposited droplets 6 merge at least partially which each other (the deposited droplets 6 are therefore illustrated only schematically by dashed lines) and are subsequently cured in a curing step 11 by UV-light emitted by LED's (light emitting diodes) 8 of the print head 3. The printing ink comprises a transparent or trans-lucent printing ink, preferably an UV curable liquid monomer becoming a polymer if being cured. The depositing steps 10 and the curing steps 11 are repeated subsequently until a desired three-dimensional structure 2 is built up.

In order to deposit droplets 6 in certain positions onto the substrate 5, the ejection nozzle 4 are individually controllable by a printing controller 18 of the printing system 1. The horizontal extension of the print head 1 is substantially greater than the horizontal extension of the three-dimensional structure 2 to be printed, so that a movement of the print head 3 relative to the substrate 2 is not necessary to build up the three-dimensional structure 2 in the present example. The print head 3 typically comprises around 100 to 5.000 ejection nozzles 4 arranged in parallel. The print head 3 and the substrate 5 are movable relative to each other. In the present example, movement of the print head 4 relative to the substrate 5 is obtained either by actively driving the print head 4 or by actively driving the substrate 5 respectively by corresponding drive units (not shown).

The print head 3 and in particular the individual ejection nozzles 4 are controlled by the printing controller 18 in dependency of an intensity image (not shown). The intensity image comprises a two-dimensional pattern of different greyscale intensities. The pattern consists of different pixels, wherein each pixel represents a certain position in the three-dimensional structure 2 to be printed. In particular, each pixel represents a certain position of a two-dimensional projection of the three-dimensional structure 2 onto the substrate 5. The intensity in each pixel of the intensity image represents the height of the three-dimensional structure 2 at the corresponding position and therefore the number of droplets 6 to be deposited in this position by the corresponding ejection nozzles 4 in subsequent depositing steps 10. The printing controller 18 now controls each of the plurality of printing nozzles 4 in such a manner that the number of droplets 6 deposited in each position on the substrate 5 corresponds to the intensity of the intensity image after all depositing steps 10 have been subsequently performed. The three-dimensional structure 2 is thereby built up step by step until the amount of printing material deposited in each position correspond to the intensity in the pixels of the intensity image. In this manner, the droplets 6 are deposited side by side and one above the other in order to generate the desired three-dimensional structure 2. As mentioned above, curing steps 11 are performed optionally between two subsequent depositing steps 10 in order to partially cure the deposited droplets 6 and to avoid that the deposited droplets 6 completely deliquesce after deposition.

In practice, the ejection characteristics of the ejection nozzles 4 are affected by clogging of printing ink and contamination with e.g. foreign particles and impurities. For this reasons, it happens from time to time that one or few ejection nozzles 4 of the print head 3 eject(s) less amount of printing ink with each droplet 6 in each depositing step 10 or that the ejection direction of the droplet 6 to be deposited is affected. Ejection nozzles 4 with a such like ejection characteristic are hereinafter referred to as malfunctioning ejection nozzles 4'. Furthermore, it can happen that a certain ejection nozzle 4 ejects more printing ink with each droplet 6 than usual. These ejection nozzles 4 are also hereinafter referred to as malfunctioning ejection nozzles 4'. All other ejection nozzles 4 being not clogged and working properly are hereinafter referred to as properly functioning ejection nozzles 4". As malfunctioning ejection nozzles 4' sometimes becomes open again (declogging) and properly functioning ejection nozzles 4" getting clogged due to unpredictable circumstances, the locations of the malfunctioning ejection nozzles 4' inside the print head 3 changes and cannot be determined or considered upfront before putting the printing system 1 into operation.

The resulting deviations of the ejection characteristics between malfunctioning ejection nozzles 4' and properly functioning ejection nozzles 4" in the same print head 3 lead to inequalities and non-uniformities in the printed three-dimensional structure 2. These inequalities and non-uniformities sum up with each layer of deposited droplets 6. Usually, these inequalities and non-uniformities are so small that no visible and disturbing influences occur. However, in the present example, the three-dimensional structure 2 comprises an ophthalmic lens, wherein even the finest small inequalities and non-uniformities lead to serious optical defects disturbing the optical beam path when using the ophthalmic lens. In particular, these inequalities and non-uniformities generate unwanted diffractive phenomena.

In order to avoid these inequalities and non-uniformities in the printed three-dimensional structure 2, although the print head 3 comprises malfunctioning ejection nozzles 4' as well as properly functioning ejection nozzles 4", the printing system 1 is provided with a measuring unit 16. In the present example, the measuring unit 16 comprises a line scanner measuring surface properties of a pre-structure 2' being built up by droplets 6 deposited in one or more previous depositing steps 10. This measuring step 13 is performed after each depositing step 10 or after at least a predefined number of depositing steps 10.

The measuring unit 16 is preferably configured to measure the surface properties by use of triangulation measurements in the measuring step 13. The triangulation measurements comprise a process of determining the location of a point on the surface of the pre-structure 2' by measuring angles to it from known points (at the print head 3) at either ends of a fixed baseline, rather than measuring the distance to the point directly. Particularly, the measuring unit 16 comprises means for performing LASER-triangulation which is a comparatively precise and reliable method for determining geometry surface properties of the pre-structure 2', in particular the height of the pre-structure 2' in each locations or pixel. The measured surface properties data are provided from the measuring unit 16 to a processing unit 16.

The processing unit 16 determines the surface flow of the pre-structure 2' from the measured surface properties and compares the actual surface flow of the printed pre-structure 2' with the nominal surface flow in a determining step 14. The nominal surface flow comprises e.g. a pre-defined nominal surface pattern stored in the processing unit 17 and defining how the surface flow of the pre-structure 2' should theoretically look if all ejection nozzles 4 would work perfectly properly. In this way, deviations between the true surface flow and the nominal surface flow can be identified and used to determine ejection characteristics of the involved ejection nozzles 4. A deviation in the form of an unwanted depression in the surface flow of the printed pre-structure 2', is a measure for the presence of an ejection nozzle 4' at the corresponding location or pixel having an ejection rate which deviates from the ejection rates of the surrounding ejection nozzles 4' because less printing ink has been deposited in this location or pixel and therefore the depression occurs. The ejection rate of this individual ejection nozzle 4 is lower because the ejection nozzle 4 is e.g. clogged. The presence of a protrusion in the surface flow is also an indicator for a malfunctioning ejection nozzle 4' because the ejection nozzle 4 at the location of the protrusion ejects to much printing ink in each depositing step 10 or the ejection direction of a neighboring ejection nozzle 4' is incorrect, so that too much printing ink is located somewhere else causing there the protrusion and too less printing ink is located below the malfunctioning ejection nozzle 4' causing there a depression. That means the overall flatness of the surface of the pre-structure 2' is analyzed by the processing unit 17: If a local depression or a protrusion is found in the surface flow (which is not caused by the nominal design of the three-dimensional structure 2 to be printed) at a certain location or pixel, the corresponding ejection nozzle 4 located above that depression (at least during the last depositing step 10) must be a malfunctioning ejection nozzle 4'. If an unwanted local depression or protrusions is not found in a certain location or pixel, the corresponding ejection nozzle 4 located above that location or pixel (at least during the last depositing step 10) must be a properly functioning ejection nozzle 4". In this way, the processing unit 17 determines and checks the ejection rates of all ejection nozzles 4' which has been involved in building up the pre-structure 2'.

Preferably, the maximum variation is quantified by a predefined lower ejection rate threshold and a predefined upper ejection rate threshold, whereas a predefined ejection rate target interval lies between the lower and the upper ejection rate thresholds. Those ejection nozzles 4 whose ejection rate remains below the predefined lower ejection rate threshold or whose ejection rate exceeds the predefined upper ejection rate threshold are identified as malfunctioning ejection nozzles 4' in the determining step 14 and those ejection nozzles 4 whose ejection rate remains inside the predefined ejection rate target interval are identified as properly functioning ejection nozzles 4" in the determining step 14.

If the presence of at least one malfunctioning ejection nozzle 4' is identified in the determining step 14, the printing controller 18 controls subsequent depositing steps 10 in view of the (location of the) at least malfunctioning ejection nozzle 4' in order to dispel or at least minimize negative effects of the at least one malfunctioning ejection nozzle 4'. In principle, the present invention provides five different debugging operating modes for the printing controller 18 defining how to handle subsequent depositing steps 10 when malfunctioning ejection nozzles 4' have been identified and located in the print head 3:

First Debugging Operating Mode

If only one or few malfunctioning ejection nozzles 4' have been identified and these malfunctioning ejection nozzles 4' are located in such a manner that the print head 3 still comprises a coherent area of properly functioning ejection nozzles 4" being at least as big as the three-dimensional structure 2 to be printed, the malfunctioning ejection nozzles 4' are simply disabled and the print head 3 is moved relative to the substrate 5 such that the following depositing steps 10 can be performed only with enabled properly functioning ejection nozzles 4". This operating mode is appropriate in cases when only few malfunctioning ejection nozzles 4' exists or when the malfunctioning ejection nozzles 4' are located in border areas of the print head 3 or when the extension of the print head 3 is large compared to the extension of the three-dimensional structure 2 to be printed, for instance. If the identified malfunctioning ejection nozzles 4' are e.g. distributed all over the print head 3, the first debugging operating mode is not applicable anymore and another debugging operating mode is performed.

Preferably, disabling malfunctioning ejection nozzles 4' means that the ejection rate and therefore also the number of droplets 4 ejected in subsequent depositing steps 10 by these ejection nozzles 4 is reduced to zero. Thus, the malfunctioning ejection nozzles 4' are not involved in building up the three-dimensional structure 2 from the pre-structure 2' anymore.

Second Debugging Operating Mode

The printing controller 18 controls the identified malfunctioning ejection nozzles 4' whose ejection rates remains below a predefined lower ejection rate threshold in such a manner that the amount of printing ink ejected with each droplet 6 in subsequent depositing steps 10 is increased. That means that the ejection rate for each droplet 6 is increased, so that malfunctioning ejection nozzles 4' whose ejection rates remains below a predefined lower ejection rate threshold eject bigger droplets 6 in each following depositing step 10.

In this way, the ejecting characteristics of the properly functioning ejection nozzles 4" and the ejecting characteristics of the malfunctioning ejection nozzles 4' can be aligned.

Additionally or alternatively, the printing controller 18 controls the identified properly functioning ejection nozzles 4" in such a manner that the amount of printing ink ejected with each droplet 6 in subsequent depositing steps 10 is decreased. That means that the ejection rate for each droplet 6 is decreased, so that properly functioning ejection nozzles 4" eject smaller droplets 6 in each depositing step 10. Also in this way, the ejecting characteristics of the properly functioning ejection nozzles 4" and the ejecting characteristics of the malfunctioning ejection nozzles 4' can be aligned with each other.

If malfunctioning ejection nozzles 4' whose ejection rates exceeds a predefined upper ejection rate threshold are identified, the printing controller 18 controls the identified malfunctioning ejection nozzles 4' whose ejection rates exceeds a predefined upper ejection rate threshold in such a manner that the amount of printing ink ejected with each droplet 6 in subsequent depositing steps 10 is decreased. That means that the ejection rate for each droplet 6 of these ejection nozzles 4' is decreased, so that malfunctioning ejection nozzles 4' whose ejection rates exceeds a predefined upper ejection rate threshold eject smaller droplets 6 in each following depositing step 10.

Third Debugging Operating Mode

The printing controller 18 controls the identified malfunctioning ejection nozzles 4' whose ejection rates remains below a predefined lower ejection rate threshold in such a manner that the number of droplets 6 ejected in each subsequent depositing steps 10 is increased, preferably doubled. That means that only the malfunctioning ejection nozzles 4' whose ejection rates remains below a predefined lower ejection rate threshold ejects two droplets 6 of printing ink in each following depositing step 10, whereas the properly functioning ejection nozzles 4" furthermore eject only one droplet 6 of printing ink in each depositing step 10. In this way, the lower ejecting rate of a e.g. clogged malfunctioning ejection nozzles 4' can be compensated and the ejection characteristics of the properly functioning ejection nozzles 4" and the ejecting characteristics of the malfunctioning ejection nozzles 4' can be aligned with each other.

If malfunctioning ejection nozzles 4' whose ejection rates exceeds a predefined upper ejection rate threshold are identified, the printing controller 18 controls the identified malfunctioning ejection nozzles 4' whose ejection rates exceeds a predefined upper ejection rate threshold in such a manner that the number of droplets 6 ejected in each subsequent depositing steps 10 is decreased, preferably halved. In this case, the properly functioning ejection nozzles 4" are controlled in such a manner that they always eject two, three, four or five droplets 6. In this way, the number of droplets 6 of malfunctioning ejection nozzles 4' whose ejection rates exceeds a predefined upper ejection rate threshold a reduction to one droplet 6 can be reduced to one droplet 6.

Fourth Debugging Operating Mode

Another approach to dispel or at least minimize negative effects of the at least one malfunctioning ejection nozzle 4' is to move the print head 3 relative to the substrate 3 in a moving step 12 performed between subsequent depositing steps 10 in such a manner that each location or pixel of the three-dimensional structure 2 receives droplets 6 from properly functioning ejection nozzles 4' as well as from malfunctioning ejection nozzles 4". It must merely be ensured that the ratio between the number of droplets 6 from properly functioning ejection nozzles 4' and the number of droplets 6 from malfunctioning ejection nozzles 4 are more or less the same for all locations or pixels of the three-dimensional structure 2 after the whole printing process is finished. In this way, the droplets 6 of the malfunctioning ejection nozzles 6 are evenly distributed over the entire three-dimensional structure 2 and therefore do not cause any unwanted deviations.

If malfunctioning ejection nozzle 4' whose ejection rates remains below a predefined lower ejection rate threshold and malfunctioning ejection nozzles 4' whose ejection rates exceeds a predefined upper ejection rate threshold are identified, the print head is moved relative to the deposited droplets 6 in moving steps 12 performed between subsequent depositing steps 10 in such a manner that each pixel or location of the three-dimensional structure 2 receives droplets 6 from malfunctioning ejection nozzles 4' whose ejection rate remains below a predefined lower ejection rate threshold as well as droplets 6 from malfunctioning ejection nozzles 4' whose ejection rate exceeds a predefined upper ejection rate threshold, wherein preferably the ratio between the number of droplets 6 from malfunctioning ejection nozzles 6' whose ejection rate remains below a predefined lower ejection rate threshold as well as the number of droplets 6 from malfunctioning ejection nozzles 4' whose ejection rate exceeds a predefined upper ejection rate threshold are the same or at least similar for all pixels of the three-dimensional structure 2 after the printing of the three-dimensional structure 2 finished. In this way, depressions in the surface flow originating from malfunctioning ejection nozzles 4' whose ejection rate remains below a predefined lower ejection rate threshold and protrusions in the surface flow originating from malfunctioning ejection nozzles 4' whose ejection rate exceeds a predefined upper ejection rate threshold compensate each other.

Fifth Debugging Operating Mode

Alternatively, it is also conceivable that the print head 3 is moved relative to the substrate 5 in a moving step 12 performed before the following depositing steps 10 in such a manner that the distribution of malfunctioning ejection nozzles 4' whose ejection rate remains below a predefined lower ejection rate threshold or exceeds a predefined upper ejection rate threshold and/or properly functioning ejection nozzles 4" corresponds at least partly to the shape of the three-dimensional structure 2 to be built up. That means if e.g. one part of the print head 3 comprises only or a large portion of properly functioning ejection nozzles 4" and another part of the print head 3 comprises only or a large portion of malfunctioning ejection nozzles 4' whose ejection rate remains below a predefined lower ejection rate threshold or exceeds a predefined upper ejection rate threshold and the three-dimensional structure 2 to be printed similarly comprises a first part having smaller or greater heights as a second part, the print head 3 is moved in such a position that the part of the print head 3 with the majority of properly functioning ejection nozzles 4" are located above or at least near the first part of the three-dimensional structure 2 to be printed and the part of the print head 3 with the majority of malfunctioning ejection nozzles 4' whose ejection rate remains below a predefined lower ejection rate threshold or exceeds a predefined upper ejection rate threshold are located above or at least near the second part of the three-dimensional structure 2 to be printed.

The printing controller 18 performs at least one of the above mentioned five debugging operating modes. The person skilled in the art recognizes that the five above mentioned debugging operating modes can be performed individually or in combination with each other by the printing controller 18. It is conceivable that the outcome of the debugging operating modes is verified in following determining steps 14. Perhaps, the debugging operating mode is changed, if it is recognized that the outcome of the formerly performed debugging operating mode is not sufficient.

Figure 2:
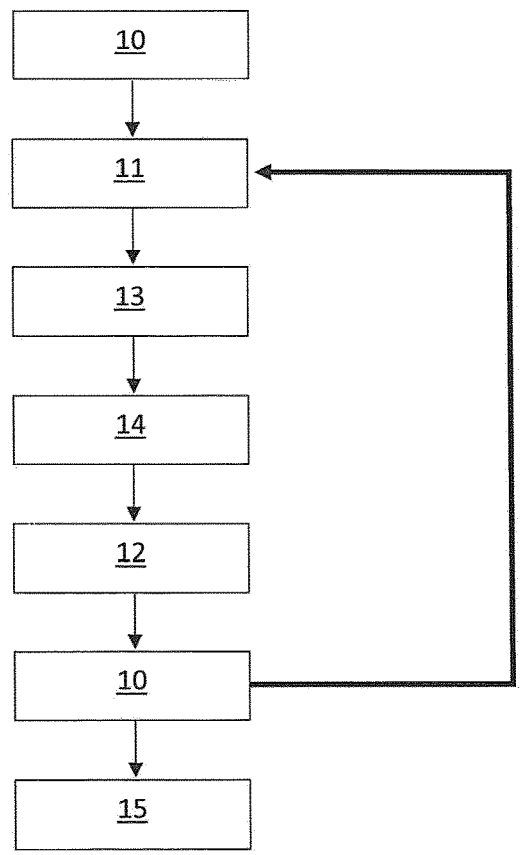
FIG. 2 illustrates different steps of the method according to the exemplary embodiment of the present invention.

In FIG. 2, different steps of the method according to the exemplary embodiment of the present invention are shown. As described above, the method comprises the depositing step 10 of ejecting a plurality of droplets 6 simultaneously and in parallel towards the substrate 5, followed by an optional curing step 11 to at least partly curing printing ink of the deposited droplets 6, followed by a measuring step 13 in which the properties of the pre-structure 3' is measured, followed by a determining step 14 for determining ejection rates of each involved ejection nozzles 4 on the basis of the measured surface properties and a subsequent depositing step 10 performed in dependency of the determined ejection characteristics of the involved injection nozzles 4. The printing cycles herewith repeats in order to build up the desired three-dimensional structure 2 step-by-step (also referred to as layer-by-layer) until the desired three-dimensional structure 2 is finished. It is conceivable that a moving step 12 is performed before the subsequent depositing step 10, wherein the moving step 12 is accomplished in dependency of the determined ejection characteristics of the involved injection nozzles 4. After the printing process has been finished, a final curing step 15 is performed optionally.

REFERENCE SIGNS

1 Printing system
2 Three-dimensional optical structure
3 Print head
4 Ejection nozzle
5 Substrate
6 Droplet
7 Horizontal plane
8 LED
9 Relative movement
10 Depositing step
11 Curing step
12 Moving step
13 Measuring step
14 Determining step
15 Final curing step
16 Measuring unit
17 Processing unit
18 Printing controller

The invention claimed is:

1. A method for printing a three-dimensional structure comprising: depositing droplets of a printing ink side by side and one above the other in several consecutive depositing steps with a print head,
   wherein the three-dimensional structure is an optical component,
   wherein in each of the depositing steps, a plurality of droplets are ejected simultaneously by a plurality of ejection nozzles of the print head,
   wherein after at least one of the depositing steps, properties of a pre-structure built up by the deposited droplets are measured by a measuring unit in a measuring step,
   wherein the pre-structure is part of the optical component to be printed,
   wherein ejection characteristics of the ejection nozzles are determined in dependency of the measured properties in a determining step, and that at least one following depositing step is performed in dependency of the ejection characteristics,
   wherein at least an ejection rate of a respective ejection nozzle is determined by a processing unit when determining ejection characteristics of ejection nozzles in the determining step,
   wherein an ejection rate is determined by comparing the measured properties with a pre-defined nominal surface pattern,
   wherein the ejection rate is determined in dependency of a surface flow of the pre-structure,
   wherein the surface flow is derived from the measured properties of the pre-structure,
   wherein depressions or protrusions in the surface flow are identified to localize malfunctioning ejection nozzles whose ejection rate remains below a predefined lower ejection rate threshold or exceeds a predefined upper ejection rate threshold, and/or
   wherein a smooth surface flow is identified to localize properly functioning ejection nozzles whose ejection rate remains inside a predefined ejection rate target interval.

2. The method according to claim 1, wherein the ejection nozzles whose ejection rate remains below a predefined lower ejection rate threshold or exceeds a predefined upper ejection rate threshold are identified as malfunctioning ejection nozzles in the determining step and/or
   wherein the ejection nozzles whose ejection rate remains within a predefined ejection rate target interval are identified as properly functioning ejection nozzles.

3. The method according to claim 2, wherein the ejection nozzles are controlled by means of a printing controller in dependency of the determined ejection rate in the at least one following depositing step,
   wherein the malfunctioning ejection nozzles whose ejection rates remain below a predefined lower ejection rate threshold are controlled in such a manner that an amount of the printing ink ejected with each droplet is increased, in the at least one following depositing step, and/or
   wherein the malfunctioning ejection nozzles whose ejection rates exceed a predefined upper ejection rate threshold are controlled in such a manner that the amount of printing ink ejected with each droplet is decreased, and/or
   wherein the properly functioning ejection nozzles are controlled in such a manner that the amount of printing ink ejected with each droplet is decreased in the at least one following printing step.

4. The method according to claim 2, wherein the ejection nozzles are controlled by means of a printing controller in dependency of the determined ejection rate in the at least one following depositing step,
wherein the malfunctioning ejection nozzles whose ejection rates remain below a predefined lower ejection rate threshold are controlled in such a manner that a number of droplets ejected by the malfunctioning ejection nozzles in the at least one following depositing step is increased, while the properly functioning ejection nozzles eject only one droplet in the at least one following printing step.

5. The method according to claim 2, wherein the ejection nozzles are controlled by means of a printing controller in dependency of the determined ejection rate in the at least one following depositing step,
wherein the malfunctioning ejection nozzles are controlled in such a manner that an amount of the printing ink and a number of droplets is decreased to zero in the at least one following depositing step.

6. The method according to claim 2, wherein the at least one following depositing step is performed in such a manner that only or at least as many as possible the properly functioning ejection nozzles ejects droplets for building up the three-dimensional structure, while the ejection of droplets by the malfunctioning ejection nozzles is disabled.

7. The method according to claim 2, wherein the print head is moved relative to the deposited droplets in moving steps performed between subsequent depositing steps in such a manner that each pixel or location of the three-dimensional structure receives droplets from the properly functioning ejection nozzles as well as droplets from the malfunctioning ejection nozzles,
wherein a ratio between a number of droplets from the properly functioning ejection nozzles and a number of droplets from the malfunctioning ejection nozzles are the same or at least similar for all pixels of the three-dimensional structure after the printing of the three-dimensional structure is finished.

8. The method according to claim 2, wherein the print head is moved relative to the deposited droplets in moving steps performed between subsequent depositing steps in such a manner that each pixel or location of the three-dimensional structure receives droplets from the malfunctioning ejection nozzles whose ejection rate remains below a predefined lower ejection rate threshold as well as droplets from the malfunctioning ejection nozzles whose ejection rate exceeds a predefined upper ejection rate threshold,
wherein a ratio between a number of droplets from the malfunctioning ejection nozzles whose ejection rate remains below a predefined lower ejection rate threshold as well as the number of droplets from the malfunctioning ejection nozzles whose ejection rate exceeds a predefined upper ejection rate threshold are the same or at least similar for all pixels of the three-dimensional structure after the printing of the three-dimensional structure is finished.

9. The method according to claim 2, wherein the print head is moved relative to the deposited droplets in a moving step that is performed before the at least one following depositing step in such a manner that only or at least as many as possible of the properly functioning ejection nozzles are located above an area where the three-dimensional structure is to be built up in the at least one following depositing step.

10. The method according to claim 2, wherein the print head is moved relative to the deposited droplets in a moving step that is performed before the at least one following depositing step in such a manner that a distribution of the malfunctioning ejection nozzles whose ejection rate remains below a predefined lower ejection rate threshold or exceeds a predefined upper ejection rate threshold and/or the properly functioning ejection nozzles corresponds at least partly to a shape of the three-dimensional structure to be built up in the at least one following depositing step.

11. The method according to claim 1, wherein the deposited droplets are at least partly cured after each of the depositing steps and/or before each measuring step in a curing step.

12. The method according to claim 1, wherein movement of the print head relative to the deposited droplets is obtained by actively driving the print head, while a substrate on which the droplets are deposited stands still, or by moving the substrate on which the droplets are deposited, while the print head stands still.

13. A printing system for printing a three-dimensional structure by performing the method according to claim 1, wherein the printing system comprises the print head for depositing the droplets of the printing ink side by side and one above the other in the several consecutive depositing steps,
wherein the print head comprises the plurality of the ejection nozzles for ejecting the plurality of the droplets simultaneously in each of the depositing steps,
wherein the printing system comprises the measuring unit for measuring the properties of the pre-structure built up by the deposited droplets in the measuring step,
wherein the printing system comprises the processing unit configured for determining the ejection characteristics of the ejection nozzles in dependency of the measured properties in the determining step and a printing controller configured for controlling the print head in such a manner that the following depositing step is performed in dependency of the determined ejection characteristics,
wherein the three-dimensional structure is an optical component,
wherein the pre-structure is part of the optical component to be printed,
wherein at least an ejection rate of a respective ejection nozzle is determined by the processing unit when determining the ejection characteristics of ejection nozzles,
wherein an ejection rate is determined by comparing the measured properties with a pre-defined nominal surface pattern,
wherein the ejection rate is determined in dependency of a surface flow of the pre-structure,
wherein the surface flow is derived from the measured properties of the pre-structure,
wherein depressions or protrusions in the surface flow are identified to localize malfunctioning ejection nozzles whose ejection rate remains below a predefined lower ejection rate threshold or exceeds a predefined upper ejection rate threshold, and/or
wherein a smooth surface flow is identified to localize properly functioning ejection nozzles whose ejection rate remains inside a predefined ejection rate target interval.

14. The printing system according to claim 13, wherein the processing unit is configured for determining an ejection rate of a respective ejection nozzle when determining the ejection characteristics of the ejection nozzles in the determining step, wherein the processing unit comprises a comparator for comparing the measured properties with a predefined nominal surface pattern to determine the ejection rate,
wherein the ejection rate is determined in dependency of a surface flow of the pre-structure,
wherein the surface flow is derived from the measured properties of the pre-structure,
wherein depressions or protrusions in the surface flow are identified to localize malfunctioning ejection nozzles whose ejection rate remains below a predefined lower ejection rate threshold or exceeds a predefined upper ejection rate threshold and/or wherein a smooth surface flow is identified to localize properly functioning ejection nozzles whose ejection rate remains within a predefined ejection rate target interval.

15. The printing system according to claim 13, wherein the printing controller is configured to control the ejection nozzles in dependency of the determined ejection rate in such a manner that an amount of the printing ink ejected with each droplet from malfunctioning ejection nozzles whose ejection rate remains below a predefined lower ejection rate threshold or exceeds a predefined upper ejection rate threshold is increased or decreased in the at least one following depositing step and/or that the amount of printing ink ejected with each droplet from properly functioning ejection nozzles is decreased in the at least one following printing step and/or that the number of droplets ejected by the malfunctioning ejection nozzles whose ejection rate remains below a predefined lower ejection rate threshold or exceeds a predefined upper ejection rate threshold in the at least one following depositing step is increased or decreased, while the properly functioning ejection nozzles ejects only one, two, three, four or five droplets in the at least one following printing step, and/or that the amount of the printing ink and the number of droplets from the malfunctioning ejection nozzles is decreased to zero in the at least one following depositing step and/or that only or at least as many as possible properly functioning ejection nozzles ejects droplets for building up the three-dimensional structure, while the ejection of droplets by the malfunctioning functioning ejection nozzles is disabled, and/or that each pixel of the three-dimensional structure receives droplets from the properly functioning ejection nozzles as well as droplets from the malfunctioning ejection nozzles,
wherein a ratio between the number of droplets from the properly functioning ejection nozzles and the number of droplets from the malfunctioning ejection nozzles are the same or at least similar for all pixels of the three-dimensional structure after the printing of the three-dimensional structure finished.

16. The printing system according to claim 13, wherein the printing system comprises at least one further print head for depositing compensation droplets at locations where the droplets from the malfunctioning ejection nozzles of the print head whose ejection rate remains below a predefined lower ejection rate threshold have been deposited.

17. The method according to claim 1, wherein the optical component is an ophthalmic lens.

18. The printing system according to claim 13, wherein the optical component is an ophthalmic lens.

* * * * *